United States Patent
Kempisty

(12) 
(10) Patent No.: US 6,384,870 B1
(45) Date of Patent: May 7, 2002

(54) METHOD FOR SYNCHRONIZING HDTV FORMAT CHANGE WITH ON SCREEN DISPLAY

(75) Inventor: Mark Kempisty, Richboro, PA (US)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/541,017

(22) Filed: Mar. 31, 2000

(51) Int. Cl.[7] .............................. H04N 5/50; H04N 5/46; H04N 5/445
(52) U.S. Cl. ......................... 348/569; 348/558; 348/563
(58) Field of Search .................................. 348/569, 558, 348/553, 563, 564; H04N 5/445, 5/50, 5/46

(56) References Cited

FOREIGN PATENT DOCUMENTS

WO    WO 96/19077    6/1996

OTHER PUBLICATIONS

Winzker et al.; "Architecture and Memory Requirements for stand–alone and hierarchical MPEG2 HDTV—Decpoders with Synchronous DRAMS"; 1995 IEEE (pp. 609–612).

*Primary Examiner*—Sherrie Hsia
(74) *Attorney, Agent, or Firm*—Ratner & Prestia

(57) ABSTRACT

A decoder of a digital television signal includes apparatus for synchronizing changes in the format of the digital television signal to corresponding changes in the format of an on-screen display. The apparatus includes a video decoder that receives the digital television signal, determines the format of the digital television signal and whether this format represents a format change. When the decoder identifies a format change, it generates an output signal indicating the format change and assigns a unique identifier to the format change. This output signal is sent to an on-screen display processor and to a user interface processor. The user interface processor is coupled to the video decoder and to the on-screen display processor to receive the output signal and to generate commands for the on-screen display processor. With one of these commands, the user interface sends the unique identifier received from the decoder to the on-screen display processor. The on-screen display processor is disabled by the decoder when a format change is identified. The on-screen display processor monitors the identifiers received from the decoder and from the user interface and enables the display of on-screen display messages only when the two identifiers are the same.

14 Claims, 4 Drawing Sheets

METHOD FOR SYNCHRONIZING HDTV FORMAT CHANGE WITH ON SCREEN DISPLAY

FIELD OF THE INVENTION

The present invention relates to a decoder that converts a digital television signal into an output video signal, and more specifically to a method and apparatus for synchronizing format changes in a digital television signal with corresponding format changes for an on-screen display.

BACKGROUND OF THE INVENTION

In the United States a standard has been adopted for terrestrially broadcast digitally encoded high definition television signals (HDTV). A guide to the use of this standard entitled, "Guide to the Use of the ATSC Digital Television Standard", Doc. A/54 (1995), is provided by the Advanced Television Systems Committee (ATSC), and is hereby incorporated by reference. A portion of this standard is essentially the same as the MPEG-2 standard, proposed by the Moving Picture Experts Group (MPEG) of the International Organization for Standardization (ISO). The MPEG-2 standard is described in an International Standard (IS) publication entitled, "Information Technology—Generic Coding of Moving Pictures and Associated Audio, Recommendation H.626", ISO/IEC 13818-2, IS, November 1994 which is available from the ISO and which is hereby incorporated by reference for its teaching on the MPEG-2 digital video coding standard. The MPEG-2 standard is also used for digital cable transmissions and digital satellite transmissions.

This standard defines a complex syntax that contains a mixture of data and control information. Some of this control information is used to enable signals having several different formats (resolutions) to be covered by the standard. These formats define images having differing numbers of picture elements (pixels) per line, differing numbers of lines per frame or field, and differing numbers of frames or fields per second. These formats are typically referenced by the number of horizontal lines in the image and whether each image frame is formed from two fields, each containing alternate lines of the frame (interlaced) or from a single image field containing all of the lines of the frame (progressive). Listed from highest resolution to lowest resolution, the television signal formats defined by the ATSC standard, for example, are referenced by the designations, 1080I, 720P, 480P and 480I. In these designations, the number refers to the number of horizontal lines in the image and the letter defines the resulting image as being interlaced (I) or progressive (P).

Because these formats define different numbers of lines per image field or frame, they inherently change the way in which the display device operates. Some display devices, generically referred to as multisync monitors, can display more than one format. Two types of multisync monitors are Native Mode Monitors and Hybrid Mode. Native mode display devices support all of the ATSC formats and hybrid mode displays support all formats except for 1080I. A broadcaster may change the format of the digital data that it sends, for example, from 480I to 720P. If the viewer uses a set-top box such as the TU-DST51 DTV Decoder Set-Top Box manufactured by Panasonic with a multisync monitor, the viewer may also change the display format independently of the format of the received signal. Thus, the viewer who receives the 720P program may choose to display it as a 480P video sequence.

Thus, a digital television decoder, such as the above-referenced set-top box, may decode the mixture of data and control information in the ATSC or MPEG bit stream and provide a video signal for displaying a video image in a format specified in the bit-stream or requested by the viewer. An on-screen display (OSD) processor of a decoder may be used to provide an OSD in combination with the video image. The OSD is used, for example to display control menus and channel guides. Because the format of the digital signal (480I, 480P, 720I, etc.) may change as necessary and may be indicated as part of the data and control information, the format of the on-screen display needs to change so that, at any given time, it is compatible with the current format of the display device. Due to the number of ways that the display format can be changed, situations may exist when the OSD has been programmed to provide a display in one format but the display device has been converted to another format. In this instance, the on-screen display may be distorted or unreadable.

SUMMARY OF THE INVENTION

To prevent the user from viewing an incorrectly formatted OSD, it is desirable to inhibit the on-screen display during this period of transition among display formats and re-enable the OSD once it is synchronized with the current format of the digital television signal.

The present invention is embodied in apparatus and a method for synchronizing a digital television signal and an on-screen display. The apparatus includes a video decoder which receives a digital television signal, determines the display format to be used, and generates an output signal based on the format. The apparatus also includes a user interface coupled to the video decoder and to an on-screen display processor to receive the output signal and generate data to be displayed as the on-screen display. The on-screen display processor is coupled to the video decoder and the user interface to receive the output signal and the OSD data. When the formats of the output signal and the OSD data match, the format of the digital television signal and the on-screen display are synchronized and the on-screen display is enabled.

According to another aspect of the invention, the format is part of the digital television signal.

According to a further aspect of the invention, the format is determined by the user.

The method for synchronizing an on screen display with a digital television signal includes determining a current display format for the digital television signal; comparing the current format with a previous format; and selectively displaying an image based on the comparison.

According to one aspect of the invention, the method assigns an identifier to the format; provides the identifier to a user interface and the on-screen display; and provides to the on-screen display a further identifier from the user interface based on the identifier provided to the user interface.

According to another aspect of the invention, the on-screen display is enabled if the identifier and the further identifier match.

According to yet another aspect of the invention, the on-screen display is disabled if the identifier and the further identifier that are most recently received do not match.

BRIEF DESCRIPTION OF THE DRAWINGS

These and other features and advantages of the present invention will become apparent from the following detailed description, taken in conjunction with the accompanying drawings, wherein.

DETAILED DESCRIPTION

The present invention is described below with reference to the MPEG-2 video signal encoding standard. The teachings of this invention are not limited to applications using the MPEG-2 video signal, however, but are applicable to other video display systems having multiple display formats that may be used in a receiver which provides an on screen display (OSD).

The MPEG-2 Main Profile standard defines encoding of a video signal as a sequence of images in five levels: the sequence level, the group of pictures level, the picture level, the slice level and the macroblock level. Each of these levels may be considered to be a record in a data stream, with the later-listed levels occurring as nested sub-levels in the earlier listed levels. The records for each level include a header section that contains data which is used in decoding its sub-records.

The headers of each of the sequence level, the group of pictures level, and the picture level include a user data field. Data used to generate an OSD may be included in the user data field of at least one of the sequence level header, the group of pictures level header, and the picture level header, for example. In addition, OSD data may be provided by a user interface of the television receiver, for example, to display control menus.

Figure 1:
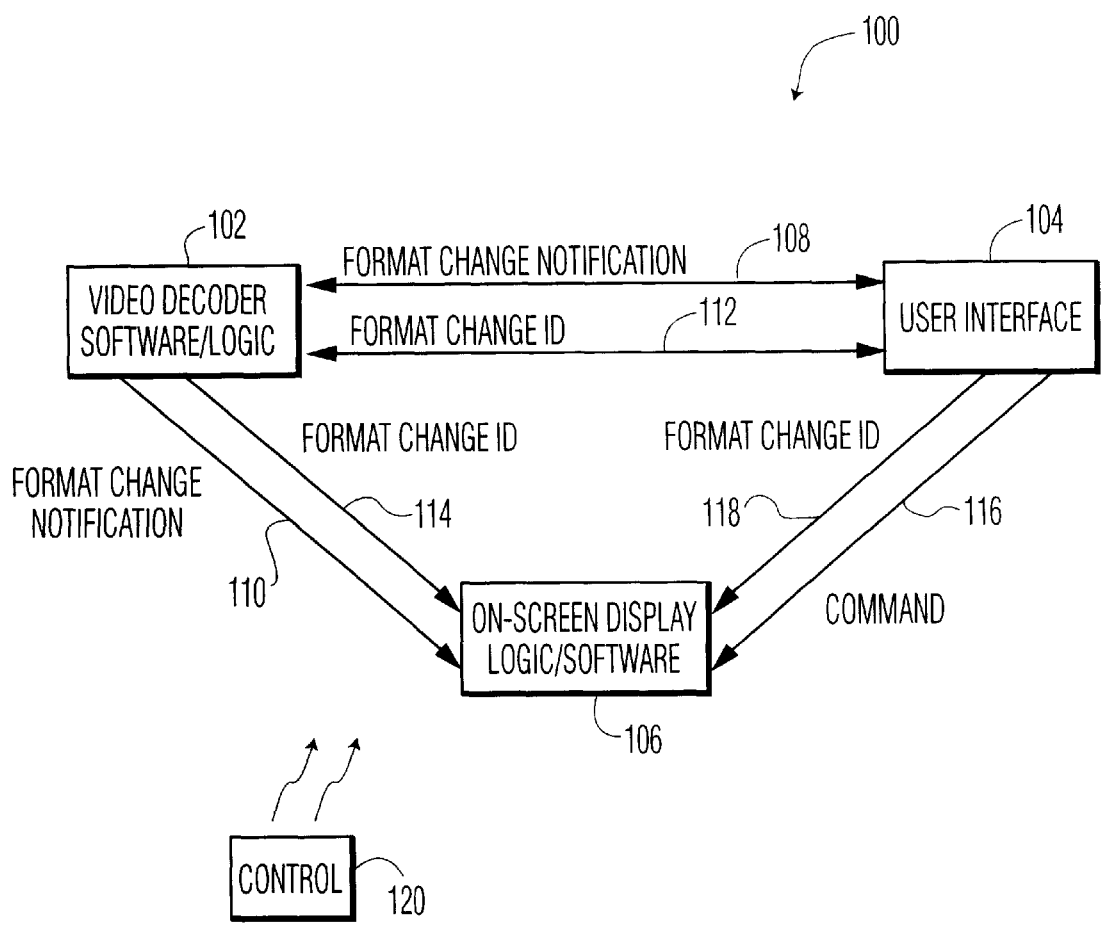
FIG. 1 is a high level block diagram of a video decoder according to the present invention.

FIG. 1 is a high level block diagram of a portion of an exemplary television receiver 100 that includes an embodiment of the present invention.

The receiver 100 has a video decoder 102, a user interface processor 104 and an on screen display (OSD) processor 106.

The video decoder 102 receives, stores and partially decodes the digital television signal (not shown). The video decoder 102 determines if the format of the current digital television signal has changed as compared to the last digital television signal. This information may be obtained, for example, from the sequence headers of the decoded bit stream. A format change may be indicated, for example, when a new sequence header is received that indicates a different video format than the previous sequence header. If the video display format has changed, the user interface processor 104 and OSD processor 106 are sent signals 108 and 110, respectively, indicating that a format change is occurring. The video decoder 102 assigns a unique identifier (ID) to the new format and sends signals 112 and 114 containing the ID to both the user interface processor 104 and the OSD processor 106, respectively.

It is contemplated that the format of the digital television signal may change several times before the processing described below is complete. When switching among program sources, for example, a broadcaster may switch from a 480I source to a 720P source and then to a 480P source. In this case, the process of changing the display format is restarted without regard to the status of the current format change process. As such, the OSD processor 106 and user interface processor 104 always have the most current information regarding the format change.

When the user interface 104 receives signal 108 from the decoder 102 indicating a format change, a command signal 116 is generated by the user interface and sent to the OSD, along with the ID signal 118 received by the user interface processor 104 from the decoder 102. This command signal causes the OSD processor to enter an initialization mode. Upon receipt of the command signal 116 and ID 118, the OSD disables further display and begins reconfiguration based on the display format corresponding to the ID 118.

With respect to the OSD initialization, it is contemplated that during this period the OSD processor 106 may blank the on-screen display, freeze the current display or display a pre-selected image to the viewer, for example. The pre-selected image may be a screen saver type of display or a message informing the viewer that the format of the display is changing.

The user interface 104 re-enables the OSD 106 after a predetermined period of time by sending an appropriate command signal 116. The OSD 106, responsive to this command signal, compares ID signals 114 and 118 to determine if the ID signals match. If the ID signals match, the OSD processor 106 enables on-screen display. If the ID signal 114 and 118 do not match, this indicates that another format change is occurring, the OSD 106 then ignores the enable command signal 116 and awaits further instructions from the user interface 104.

Alternatively, the change in display format may be initiated by the user interface when a viewer having a multisync monitor requests a display format that differs from the inherent format of the digital video signal. In this instance, the user interface 104 sends a format change notification to the video decoder 102 to cause the video decoder to convert the decoded video signal into a format compatible with the viewer selection. Except for receiving the format change notification from the user interface processor 104 instead of from the input video signal, the process may operate in the same way as described above. It is contemplated, however, that the user interface processor 104 may generate the unique ID for the format change and provide the ID to the decoder 102 via the path 112. In addition, the decoder 102 may pass this ID on to the OSD processor 106 as the signal 114. In this alternative embodiment, the OSD processor 106 operates in the same way, changing the format of the OSD only when the IDs 118 and 114 from both the decoder 102 and the user interface 104 match. Alternatively, the user interface processor may generate a "don't care" ID that is sent to just the OSD processor 106. In this embodiment, the OSD processor 106 recognizes the "don't care" ID as matching any other ID.

It is contemplated that the video decoder 102 and OSD processor 106 may each be implemented in hardware, software or a combination thereof.

In addition, although the decoder 102, user interface processor 104 and OSD processor 106 are shown as separate processors, it is contemplated that they may be combined and implemented as separate processes on one, two or more processors.

Figure 2:
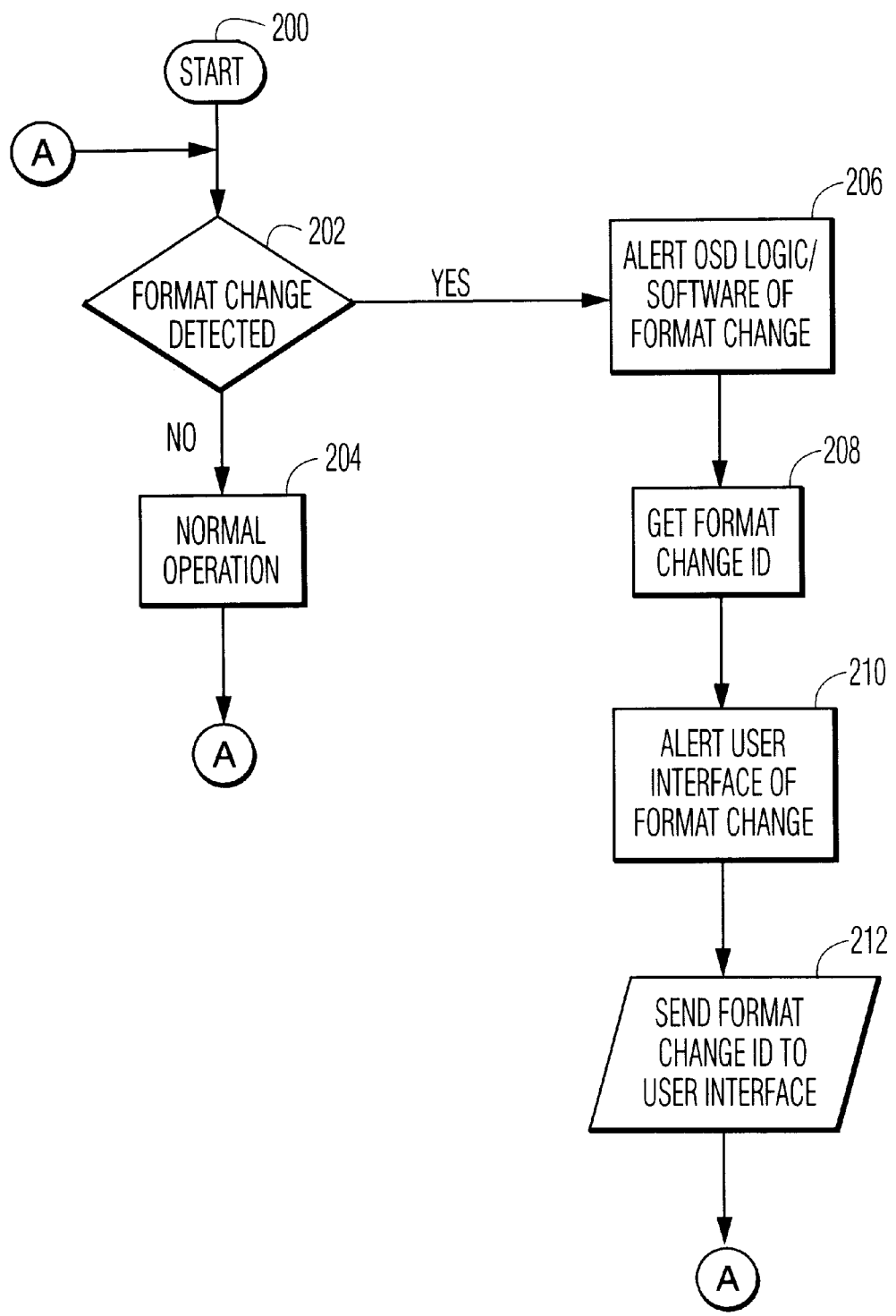
FIG. 2 is a flow-chart diagram which is useful for describing processing performed by the video decoder according to an exemplary embodiment of the present invention.
Figure 3:
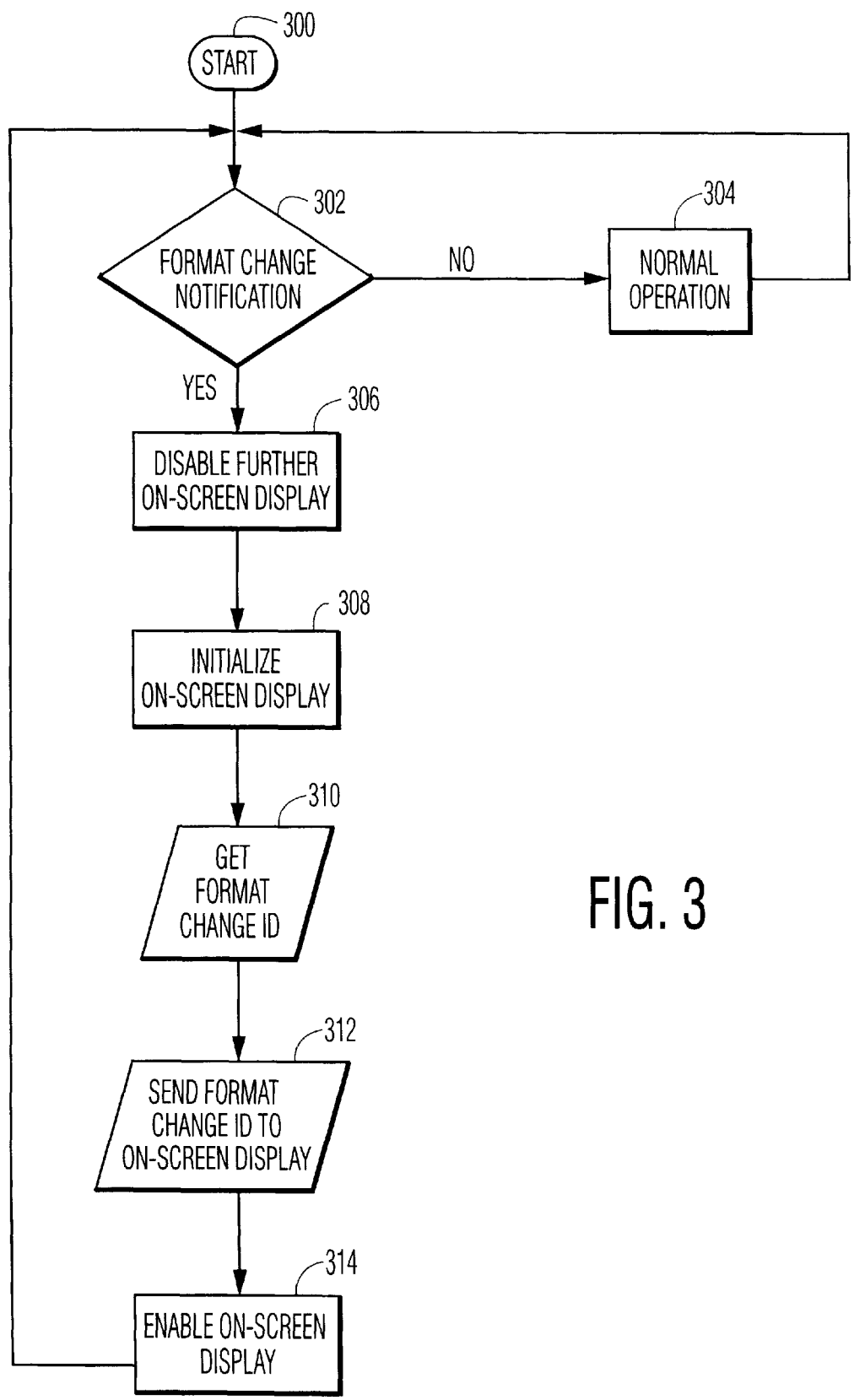
FIG. 3 is a flow-chart diagram which is useful for describing processing performed by the user interface according to an exemplary embodiment of the present invention.
Figure 4:
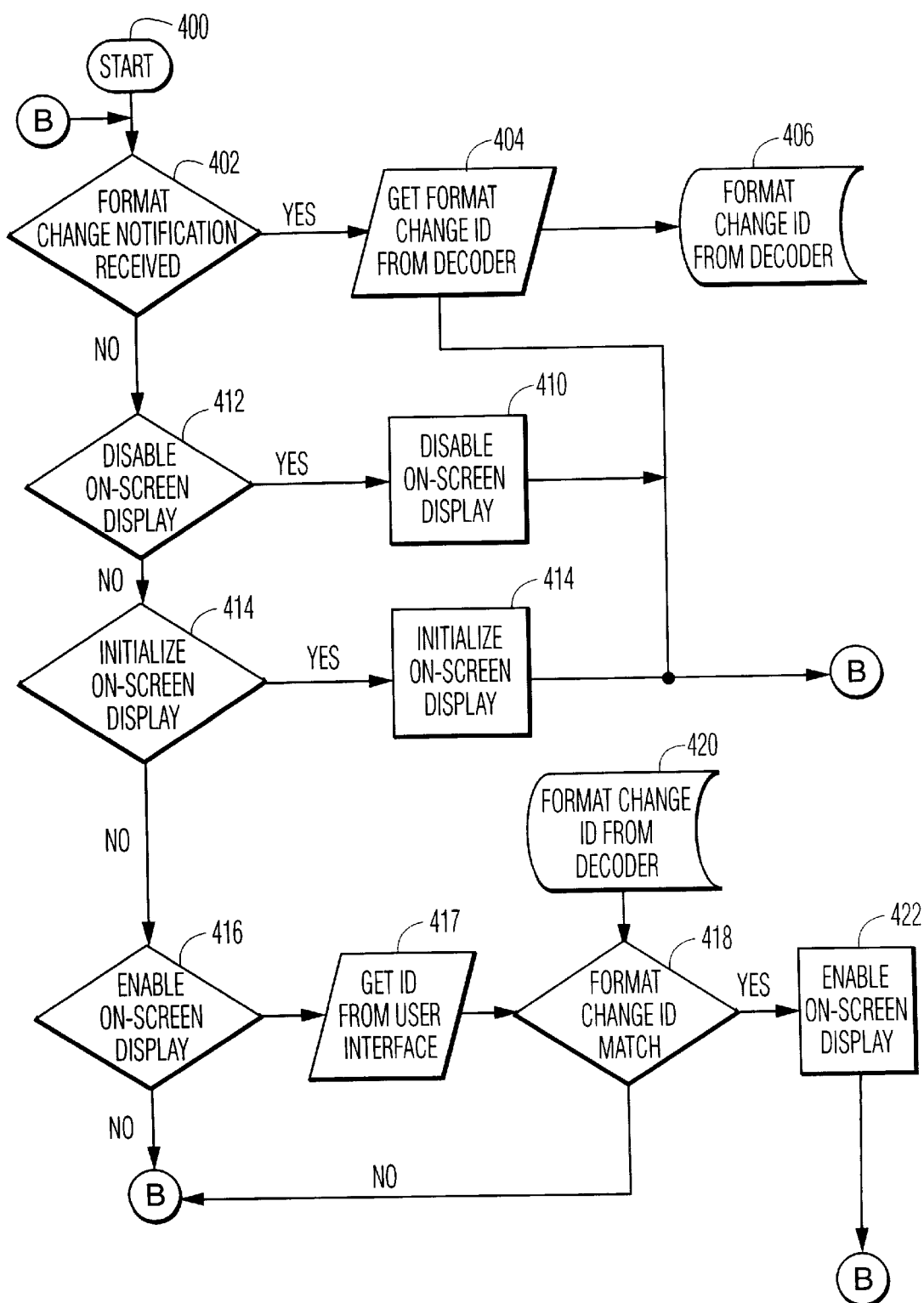
FIG. 4 is a flow-chart diagram which is useful for describing processing performed by an on screen display processor according to an exemplary embodiment of the present invention.

The exemplary embodiment of the present invention is now described with reference to FIGS. 2–4. FIG. 2 is a flow chart which is useful for describing the operation of a video decoder 102 according to the exemplary embodiment of the present invention. FIG. 3 is a flow chart which is useful for describing the operation of a user interface processor 104 according to the exemplary embodiment of the present invention. FIG. 4, is a flow chart which is useful for describing the operation of an OSD processor 106 according to the exemplary embodiment of the present invention.

Referring to FIG. 2, at step 200, the process of video decoder 102 starts. At step 202, the format of the digital signal is checked to determine if a format change has occurred. This format change may be determined in the video decoder, for example, by comparing the format specified in a newly received sequence header to the format specified in a previously received sequence header or by receiving a format change request from the user interface 104. If a format change has occurred, step 206 is entered otherwise step 204 is entered. At step 204, no format change has occurred and normal operation continues, branching back to step 202 via the connector A, for example, when a new sequence header is received or when a new format change notification is received from the user interface 104. At step 206, the format has changed and the video decoder 102 sends a format change message to the OSD 106 indicating the change in format. At step 208, the decoder 102 assigns a unique ID to the format. At step 210, the decoder 102 sends the format change notification 108 to the interface 104 and sends the ID signal via the paths 112 and 114 to both the user interface 104 and the OSD processor 106. After step 212, the process is reentered through the connection point A.

The decoder 102 assigns a unique ID to each format change to ensure that both the user interface processor 104 and the decoder 102 have reached the final format change in a sequence before the change is actually implemented by the OSD processor 106. A sequence of format changes may, for example, include a single format more than once. For example, a sequence may switch from 480I to 720P back to 480I and then to 480P. If each format change were not identified by a unique identifier then the OSD processor may erroneously match the first format (480I) to the third format (480I), causing a 480I on-screen display to be generated for the 480P signal. In the exemplary embodiment of the invention, the unique identifier may be generated, for example, by sending a count value provided, for example, by a 32-bit counter. When the count value reaches $2^{32}-1$, the next ID is zero. Alternatively, the unique identifier may be generated using a pseudo-random number generator (not shown).

Referring to FIG. 3, at step 300, the format change process of user interface 104 starts. At step 302, a check is performed to determine if the format change signal 108 has been received from the decoder 102. The format change signal 108 causes the process to branch to step 306, otherwise step 304 is entered. At step 304, normal operation continues and step 302 is reentered until a format change signal 108 is received. At step 306, the user interface first sends a command to the OSD processor to disable generation of on-screen display messages. Next, at step 308, the user interface process 104 sends a command to initialize the OSD 106. At step 310, the ID signal 112 is received from the decoder 102 and at step 312, the user interface 104 sends the ID signal 118 to the OSD processor 106. At step 314, the user interface 104 sends a command to the OSD processor 106 which enables the OSD 106, allowing it to once again generate on-screen display messages if the IDs at the OSD processor 106 match.

Referring to FIG. 4, step 400 is the start of the format change process performed by OSD processor 106. At step 402, the OSD processor 106 determines if a format change signal 110 has been received from the decoder 102. If a format change signal 110 was received, step 404 is entered. At step 404, the ID 114 is received from the decoder 102, and at step 406 this ID is stored for use during a subsequent process step. After storing the ID 114, the process continues from step 404 by reentering the process at step 402, as indicated by the connector B. If, at step 402, a format change notification was not received, then control transfers to step 408 which reads the command signal 116 to determine if the user interface processor 104 has sent a disable command to the OSD processor 106. If, at step 408, the command signal indicates OSD disable, step 410 is entered. At step 410, the OSD processor 106 disables the generation of on-screen display messages and reenters the process at step 402, as indicated by the connector B. If, at step 408, a disable command was not received, then, at step 412, the OSD processor 106 reads the command signal 116 to determine if an initialize command has been received. If the initialize command has been received, step 414 is entered. At step 414, the OSD processor 106 reinitializes itself and the process is reentered at step 402. If the command at step 412 is not an initialize command, then, at step 416, the OSD processor 106 reads the command signal 116 to determine if an enable command has been received. In response to the enable command, the OSD processor, branches to step 417 to obtain the ID from the user interface processor 104 and then to step 418. At step 418, the OSD processor compares the ID signal 118 from the user interface processor to the ID signal 114 which was stored at step 420. If the signals match, step 422 is entered, the OSD is enabled and displays OSD messages according to the new display format. After step 416, if an enable command was not received or after step 422, the process is reentered at step 402 as indicated by the connector B. In addition, if, at step 418 the ID signals 114 and 118 do not match, the process continues at step 402 without enabling the OSD processor 106 to produce on-screen display messages.

With the method described above, if several format changes are successively received, the video decoder 102, user interface 104, and OSD 106 can maintain synchronization with one another in order to prevent the user from viewing an incorrectly formatted on-screen display.

While exemplary embodiments of the invention have been shown and described herein, it will be understood that such embodiments are provided by way of example only. Numerous variations, changes, and substitutions will occur to those skilled in the art without departing from the invention. Accordingly, it is intended that the appended claims cover all such variations as fall within the scope of the attached claims.

What is claimed:

1. A method for synchronizing an on screen display processor with a format of a digital television signal, the method comprising the steps of:

receiving a new format of the digital television signal;

disabling the on-screen display processor;

assigning an identifier to the format;

providing the identifier to a user interface processor and an on-screen display processor;

providing to the on-screen display processor a further identifier from the user interface processor based on the identifier sent to the user interface processor;

comparing the identifier and the further identifier; and enabling the on-screen display processor based on the comparison.

2. The method according to claim 1, wherein the on-screen display processor is enabled if the identifier and the further identifier are equal.

3. The method according to claim 1, further including the step of displaying a blank image when the on-screen display processor is disabled.

4. The method according to claim 1, further including the step of displaying a message when the on-screen display processor is disabled.

5. The method according to claim 1, further including the step of displaying a predetermined image when the on-screen display processor is disabled.

6. The method according to claim 1, wherein the step of receiving a new format for the digital television signal recovers the new format from the digital television signal.

7. The method according to claim 1, wherein the step of receiving the new format for the digital television signal includes the step of receiving the new format from the user interface processor.

8. A method for synchronizing an on-screen display processor to a decoder and a user interface processor in a digital television receiver, the method comprising the steps of:

(a) determining, in the decoder, a current format of a digital television signal;

(b) comparing the current format with a previous format;

(c) disabling the on-screen display processor based on the comparison in step (b)

(d) providing a notification to a user interface processor and an on-screen display processor based on the comparison of step (b);

(e) assigning an identifier to the current format based on the comparison of step (b);

(f) providing the identifier to the user interface processor and the on-screen display processor;

(g) providing the identifier sent to the user interface processor, as a further identifier to the on-screen display processor;

(h) comparing the identifier and the further identifier; and (i) selectively enabling the on-screen display processor based on the comparison of step (h).

9. The method according to claim 8, wherein the on-screen display processor remains disabled if the identifier and the further identifier are not equal.

10. The method according to claim 8, wherein the on-screen display processor is enabled if the identifier and the further identifier are equal.

11. Apparatus for use with a digital television receiver comprising:

a video decoder which receives a digital television signal, determines a format change of the digital television signal, and provides an output signal including a unique identifier indicating the format change;

a user interface processor coupled to the video decoder and to an on-screen display processor to receive the output signal and propagate the output signal to the on-screen display processor as a further output signal; and the on-screen display processor coupled to the video decoder and the user interface processor to receive the output signal and the further output signal, respectively, wherein the on-screen display processor compares the unique identifiers of output signal and the further output signal and enables on-screen message displays based on the comparison.

12. Apparatus according to claim 11, wherein the on-screen display processor enables the display of on-screen messages when the output signal and the further output signal are equal.

13. Apparatus according to claim 11, wherein the user interface processor further comprises means for allowing a user to specify the format of the digital television signal and means for providing the specified format to the video decoder as the format change.

14. Apparatus for synchronizing a digital television signal and an on-screen display, the apparatus comprising:

a decoding processor coupled to receive the digital television signal, to determine whether the format of the digital television signal represents a format change, and to generate an output signal based on the format change;

a user interface processor, coupled to the decoding processor and to the on-screen display to receive the output signal and provide the output signal as a further output signal;

an on-screen display processor, coupled to the decoding processor and to the user interface processor to receive the output signal and the further output signal, wherein the on-screen display processor compares the output signal and the further output signal, and enables the on-screen display based on the comparison.

* * * * *